INVENTORS:
ROBERT DJIDICH
ROBERT W. STRODTMAN
HOWARD F. STRODTMAN
BY
ATT'YS

INVENTORS:
ROBERT DJIDICH
ROBERT W. STRODTMAN
HOWARD F. STRODTMAN

BY

ATT'YS

Oct. 25, 1960    R. DJIDICH ET AL    2,957,374
MACHINE TOOL CONTROL MECHANISM
Original Filed Oct. 11, 1956    9 Sheets-Sheet 4

INVENTORS:
ROBERT DJIDICH
ROBERT W. STRODTMAN
HOWARD F. STRODTMAN
BY
ATT'YS

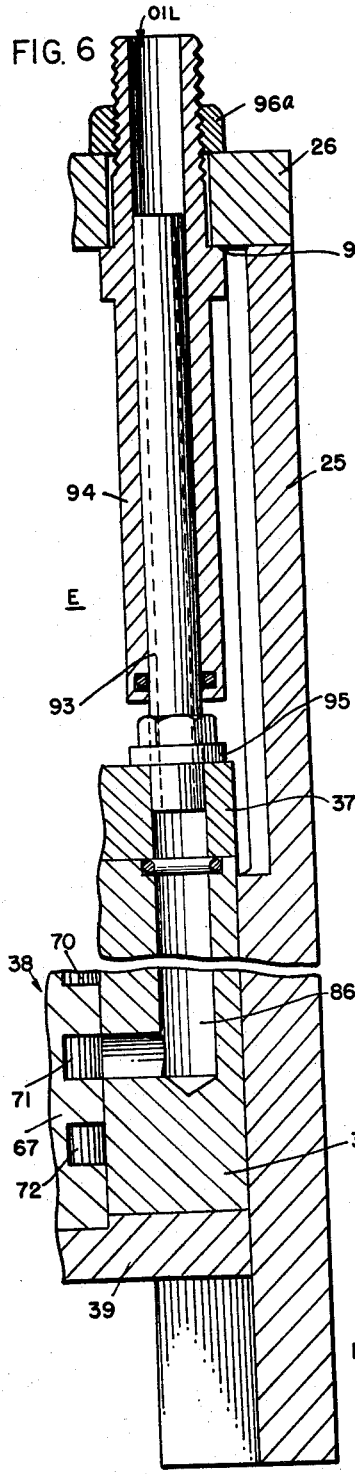

Oct. 25, 1960 — R. DJIDICH ET AL — 2,957,374
MACHINE TOOL CONTROL MECHANISM
Original Filed Oct. 11, 1956 — 9 Sheets-Sheet 6

INVENTORS:
ROBERT DJIDICH
ROBERT W. STRODTMAN
HOWARD F. STRODTMAN
BY
ATT'YS

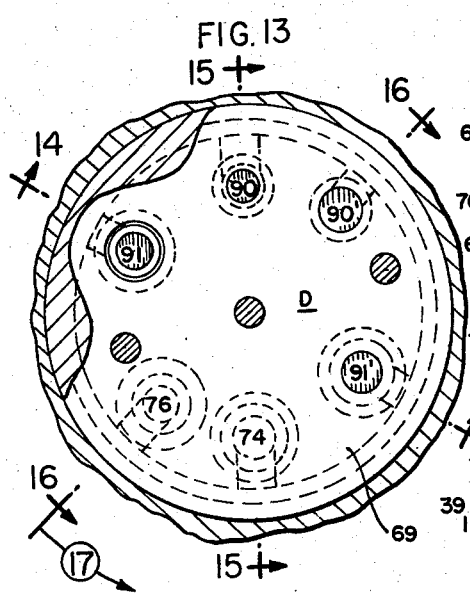
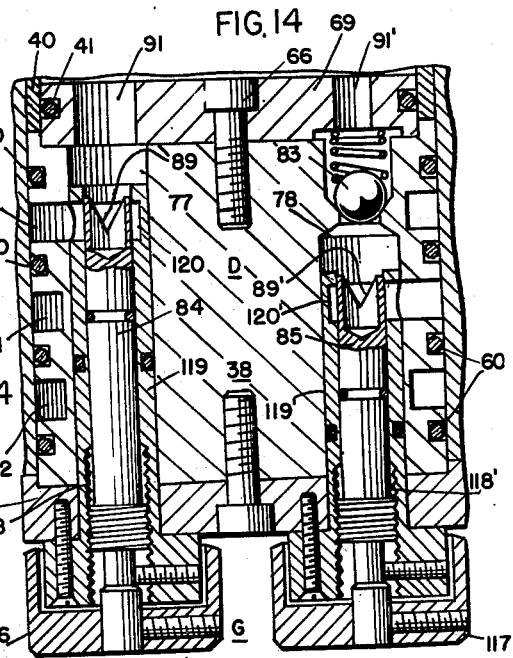
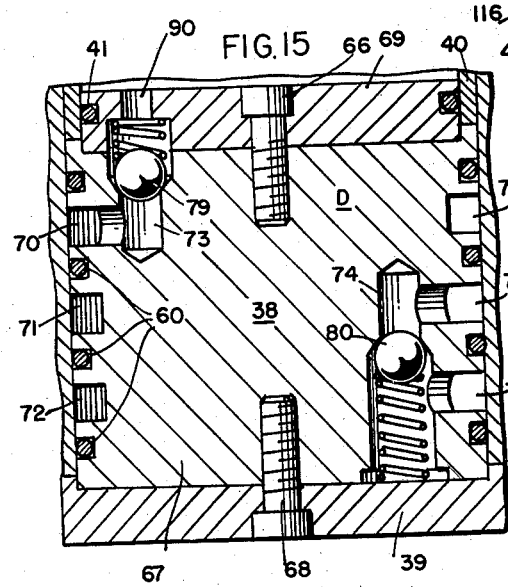
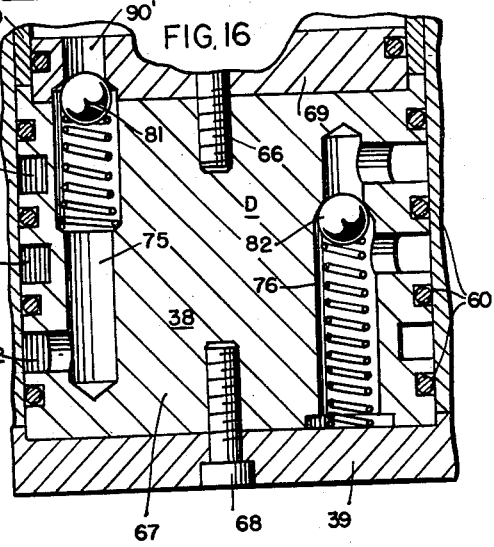

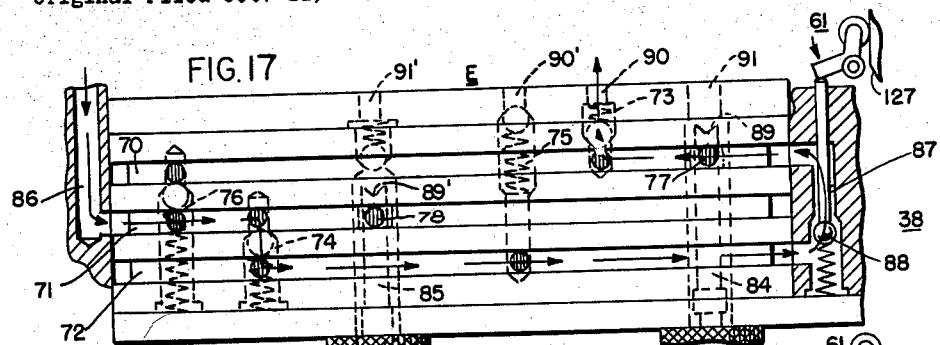
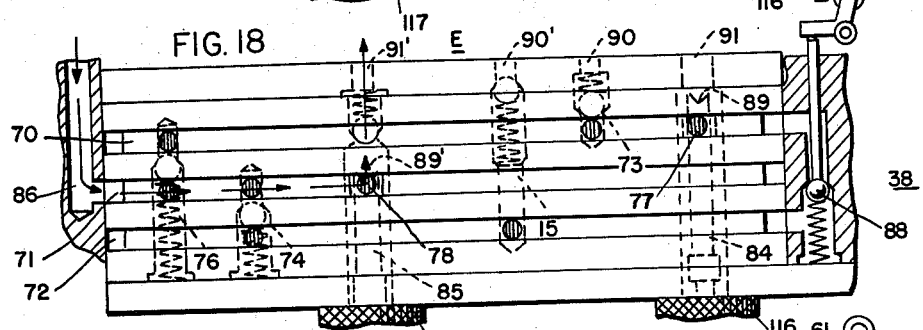
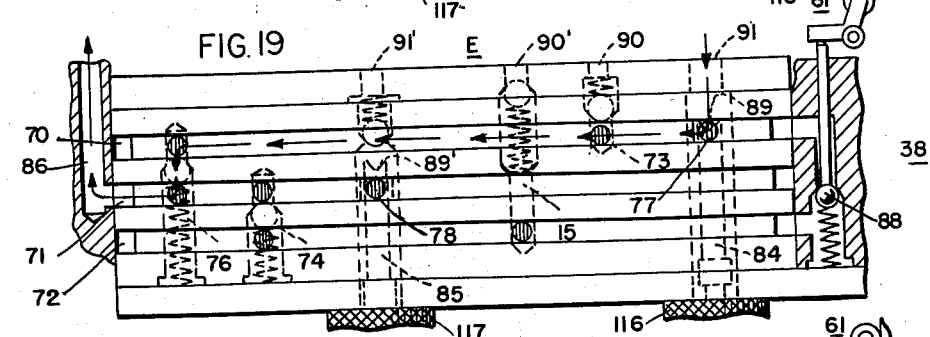
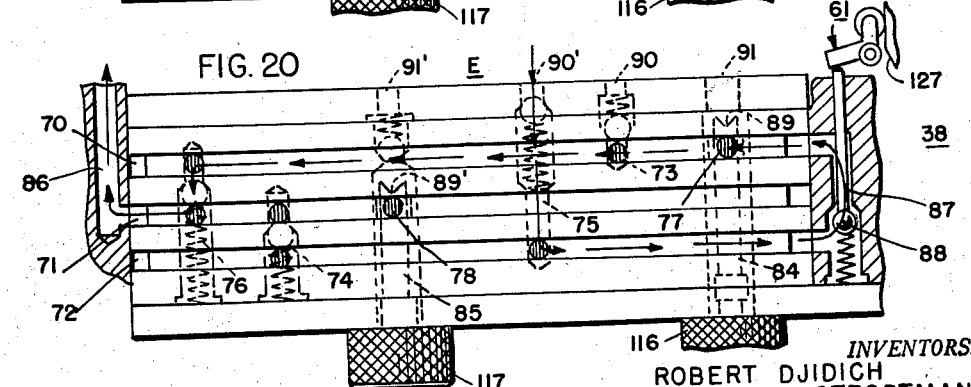

United States Patent Office 2,957,374
Patented Oct. 25, 1960

2,957,374

MACHINE TOOL CONTROL MECHANISM

Robert Djidich, Robert W. Strodtman, and Howard Strodtman, Chicago, Ill., assignors to Standard Tool & Manufacturing Company, Kearny, N.J., a corporation of New Jersey Continuation of application Ser. No. 615,410, Oct. 11, 1956. This application Oct. 15, 1959, Ser. No. 846,752

18 Claims. (Cl. 77—33.5)

The present invention relates to machine tool control mechanisms of the type wherein the stroke and the speed of advance and retraction of the tool holder are variable by manually-adjustable mechanisms. This application is a continuation of our co-pending application Serial No. 615,410, filed October 11, 1956, which was allowed April 20, 1959.

The main objects of this invention are to provide an improved mechanism of the piston-cylinder type for reciprocating a rotatable tool holder toward and away from a work piece; to provide an improved manually-adjustable mechanism for regulating the stroke of relative movement of the piston-cylinder combination; to provide an improved manually-adjustable automatically-acting fluid pressure system for variably regulating the speed of travel in both directions of the relatively-reciprocable piston-cylinder combination; to provide improved mechanism in the fluid pressure system for securing a successive rapid and slow advance and slow and rapid retraction of the tool holder; to provide improved control instrumentalities for alternating the application of fluid pressure to effect the opposite movements of the tool holder; to provide improved means actuated by the piston-cylinder combination at the opposite extremes of their relative reciprocation for alternating the application of fluid pressure; and to provide improved manually-settable means for varying the extent of the relative rapid and slow advance and slow and rapid retraction of the tool holder.

More particularly, it is one object of this invention to provide an improved machine tool control mechanism including relatively reciprocable piston and cylinder elements and valve means for controlling flow of fluid under pressure to and from the cylinder, wherein the said valve means is embodied within a cylindrical block which is fitted into one end of the cylinder and provided with annular grooves in its peripheral wall for establishing communication with ports in the wall of the cylinder irrespective of the rotational position of the block in the cylinder. By virtue of this construction, the valve means may readily be replaced at any time, thereby to facilitate cleaning and repair of the valve assembly without necessitating other than momentary stoppage of the machine tool.

Another object of the invention is the provision of improved control valve means for mechanisms of the character described, and especially the provision of a valve assembly embodied in the aforesaid block, comprising means defining a relatively unrestricted path of fluid flow for accommodating rapid advance of the tool to the work, a restricted path of flow for separately controlling the rate of feed of the tool into the work, a second restricted path for separately controlling the rate of withdrawal of the tool from the work, and a second relatively unrestricted path for accommodating rapid retraction of the tool from the work.

A further object of the invention is to provide an improved structural arrangement for controlling the alternate application of fluid pressure to the piston-cylinder combination, the arrangement including a piston mounted for limited axial movement, a spring normally retaining the piston stationary, a cylinder reciprocally mounted on the piston, a stop for the cylinder, and control means actuated by the piston as a consequence of limited movement thereof by fluid under pressure subsequent to engagement of the cylinder with the stop.

A still further object of the invention is to embody all of the aforesaid controls coaxially of the piston cylinder elements thereby to provide an exceptionally compact mechanism.

In addition to the foregoing, it is an object of the invention to provide a compact coaxial assembly as aforesaid wherein all of the connections for supply of power to the mechanism are located at the end of the mechanism remote from the work area and wherein all of the manual adjustments for the mechanism are conveniently accessible at the end of the mechanism adjacent the work area.

Other objects and advantages of the invention will become apparent in the following detailed description.

Now in order to acquaint those skilled in the art with the manner of making and using our improved machine tool control mechanism, we shall describe, in connection with the accompanying drawings, a preferred embodiment of the mechanisim and the preferred manner of making and using the same.

In the drawings:

Figure 6 is an enlarged, fragmentary vertical section of a part of the fluid pressure system, the view being taken substantially on line 6—6 of Figure 2;

Figure 7 is an enlarged fragmentary vertical section of another part of the fluid pressure system, the view being taken substantially on line 7—7 of Figure 2;

Figure 8 is an enlarged, framentary sectional view taken on line 8—8 of Figure 3 and showing part of the control system for the mechanism;

Figure 9 is a detail view of the cam lever shown in Figure 8 as viewed from the plane of the line 9—9 of that figure;

Figure 13 is a transverse, cross-sectional view taken on line 13—13 of Figure 4 and showing the valve block of our invention;

Figure 14 is a vertical, sectional, detail of the block as viewed from the plane of the line 14—14 of Figure 13;

Figure 15 is a similar view taken on the plane of line 15—15 of Figure 13;

Figure 16 is another similar view taken on the plane of the line 16—16 of Figure 13;

Figure 21:
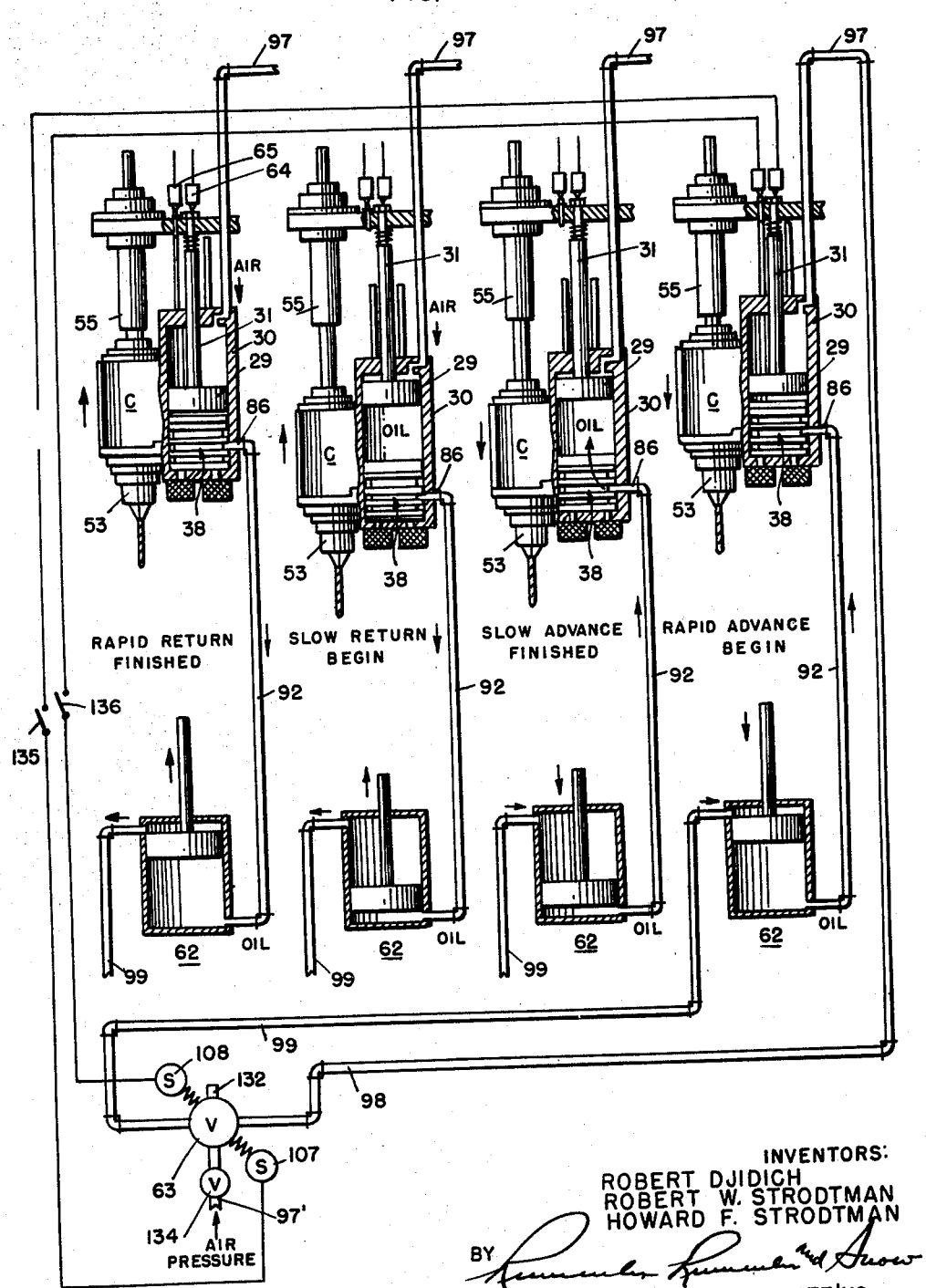

Figures 17 through 20 are schematic layout views of the mechanism shown in Figures 13–16 (as viewed in the direction of the circle (17) of Figure 13) and indicating the successive flow paths of the fluid pressure system which controls the varying speeds of travel of the piston-cylinder combination; and Figure 21 comprises four schematic layouts showing the sequence of operations of the tool holder at the beginning and ending of its rapid and slow movements.

The type of mechanism with which this invention is concerned involves a tool holder integrated with a reciprocably-mounted element the stroke and the speed of travel of which element is variably effected by an electrically-controlled, manually-regulatable oil-air hydraulic pressure system.

A machine tool embodying the foregoing concept comprises a supporting frame A, mounting a primary piston-cylinder element combination B wherewith is integrated a tool holder C the length of the stroke and speed of travel of which is controlled by the relative axial reciprocation of the piston-cylinder combination B as effected by a hydraulic system involving coordinated oil and air pressure sections D and E respectively, regulated by manually-adjustable mechanisms F and G.

The hereinafter described structure, which embraces this oil-air hydraulic pressure system, is so arranged that the initiating force of the air section is transmitted to the valve-controlled oil section so as to permit a wide manual variation of the continuous automatic reciprocation of the tool rapidly toward and away from the work and to insure slower operating speeds of the tool into and out of the work.

Figure 2:
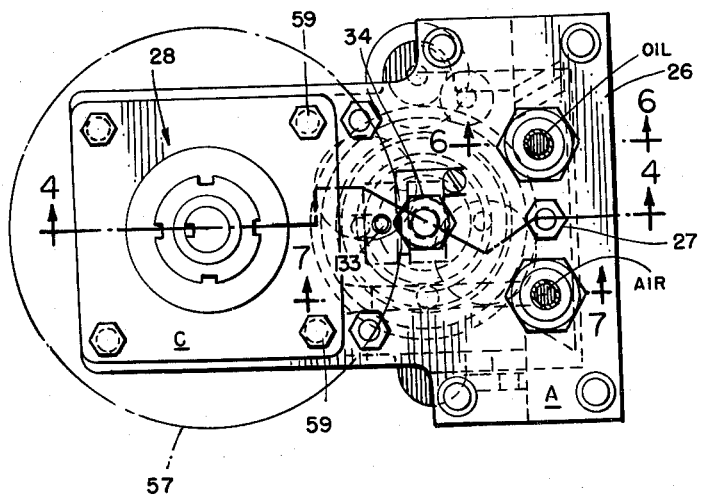
Figure 2 is a top plan of the mechanism as viewed from the plane of the line 2—2 of Figure 1.
Figure 3:
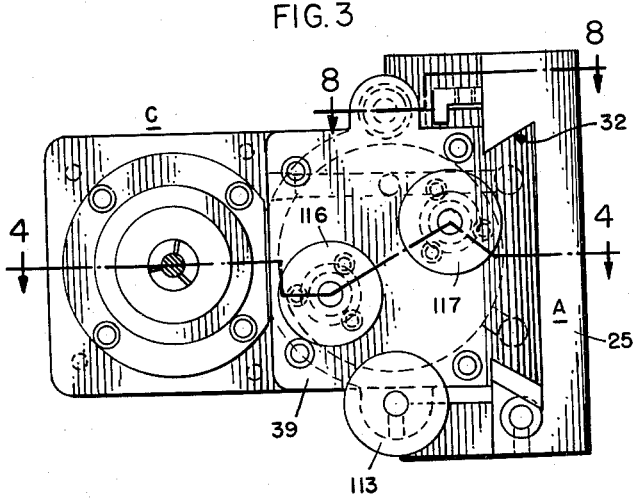
Figure 3 is a bottom plan of the mechanism as viewed from the plane of the line 3—3 of Figure 1.
Figure 4:
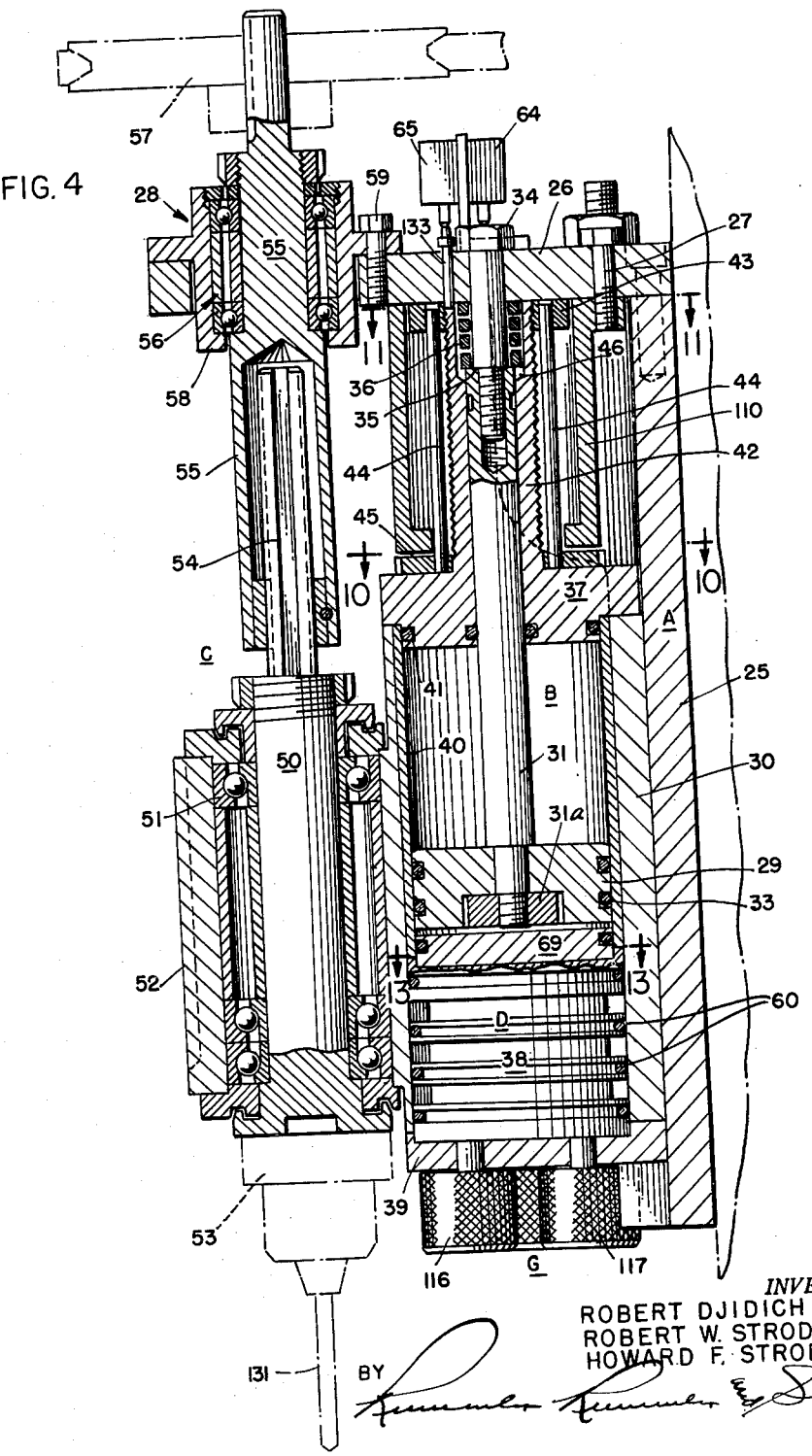
Figure 4 is a vertical section of the mechanism, the view being taken substantially on line 4—4 of Figures 2 and 3.

The supporting frame A, so far as herein shown, comprises an upright standard 25 and a transverse top plate 26 secured together by bolts 27 (Figures 2, 3 and 4). The standard 25 extends upwardly from a base (not shown) disposed outwardly below the tool holder and having suitable means thereon for the proper positioning of work pieces to be operated on by the tool in the tool holder C. On these frame parts 25 and 26 are mounted respectively the piston-cylinder combination B and a drive mechanism 28 for the tool holder C, as will be explained subsequently.

The primary piston-cylinder combination B comprises a piston element 29 and a cylinder element 30, the former being suspended relatively stationarily from the top plate 26 by a piston rod 31 and the latter being slidably supported on the standard 25 by a dovetail connection 32 (Figure 3).

The piston element 29 is secured to the lower end of the rod 31 by a recessed nut 31a. On its periphery are the conventional pressure-sealing rings 33.

The piston rod 31, at its upper end, is adjustably screwed onto a bolt 34 of smaller diameter than the rod 31, thereby forming a shoulder 35 at the upper extremity of the rod. Between the shoulder 35 and the under face of the plate 26, a heavy compression spring 36 embraces the bolt 34. The function of this spring is normally to retain the rod and piston stationary, and yet accommodate slight axial movement thereof as will be pointed out later.

The cylinder element 30 mounts a supporting head 37 at its upper end and an oil-flow valve control head or block 38 at its lower end inwardly of an end cap 39. Between the supporting and valve heads 37 and 38 is a lining 40 which slidingly contacts the piston 29.

The cylinder-supporting head 37 is annularly recessed on its lower end to fit within the bushing 40 and seats a gasket 41. This head 37 is formed with an upwardly extending reduced diameter axial extension 42 externally threaded to support an internally-threaded coaxial ring 43. The ring 43 is slidable on a pair of rods 44 secured at their lower ends to a gear 45 rotatable on the upper face of the cylinder head 37 concentrically of the extension 42. The gear 45 is a part of the stroke-adjusting mechanism F as subsequently will be explained more fully. At its upper end the extension 42 is recessed at 46 to fit over the spring 36.

The tool holder C comprises the conventional spindle 50 journalled in bearings 51 fixed in a bearing support 52. This bearing support 52 is integral with and extends outwardly at one side of the cylinder element 30, hence reciprocating with the cylinder element 30. At its lower end the spindle 50 mounts the usual tool chuck 53. A reduced-diameter upper extension 54 is splined to a hollow drive shaft 55 forming a part of the tool-holder drive 28. The drive 28 comprises a conventional roller or ball bearing 56 for the drive-shaft 55, and a V-drive pulley 57 keyed to the drive-shaft 55. The bearing 56 is fixed in a bushing 58 secured to the top plate 26 by one or more bolts 59.

As noted earlier herein, the hydraulic system, whereby the tool holder is reciprocated toward and away from the work, involves coordinated oil and air pressure sections D and E. The oil-pressure section D comprises the valve head 38, located in the cylinder element 30 and sealed thereto by O-ring seals 60 or the like, an associated cam mechanism 61, and an interconnected auxiliary piston-cylinder combination 62 (see Figure 21). The air-pressure section E comprises a solenoid-operated valve device 63 (see Figure 21) controlled by a pair of switches 64 and 65.

The valve head 38 is in the form of a cylindrical block 67 located in the bottom portion of the cylinder element 30, the same being secured to the base cap 39 of the cylinder by a bolt 68 (Figures 14–16) and carrying a cap disk 69 secured on its inner end by a bolt 66.

The periphery of the block 67 has formed therein three annular grooves 70, 71 and 72, which are sealed from one another by the O-rings 60, and a series of six longitudinal ports or passages 73, 74, 75, 76, 77 and 78 variously communicating with the annular grooves 70, 71 and 72 and/or with the interior of the cylinder element 30 intermediate the piston element 29 and the cap disk 69. All of the ports other than the port 77 are controlled by respective spring-loaded one-way ball check valves 79, 80, 81, 82 and 83, and the ports 77 and 78 are equipped with manually-adjustable cylindrical slide valves 84 and 85 respectively, the several valves serving to regulate the flow of oil for effecting the relative reciprocation of the piston-cylinder combination 29—30 (B).

The middle annular groove 71 connects with a channel 86 (see Figures 6 and 17–21) in one side of the cylinder element 30, leading to the auxiliary piston-cylinder combination 62, as will be explained presently. The upper and lower annular grooves have intercommunication by way of a by-pass channel 87 (Figures 8 and 17–21) in the cylinder element 30, which channel is controlled by a spring-loaded ball valve 88 and the cam mechanism 61.

The cap disk 69 is provided with holes therethrough defining a pair of ports 90 and 90′ aligned with the ports 73 and 75 respectively, which ports as will appear comprise relatively unrestricted paths for fluid flow in opposite respective directions. Also, the disk 69 is provided with ports 91 and 91′ aligned with the passages 77 and 78 respectively, in which the valves 84 and 85 are located, for purposes of providing restricted paths of fluid flow in opposite respective directions. The valves 84 and 85 are hollowed out at their upper ends and formed with V slots 89 and 89′ which control the rate of flow through the ports 91 and 91′.

The channel 86 in the cylinder element 30, which communicates with the middle annular groove 71 in the valve block 67, is connected with the cylinder of the auxiliary piston-cyclinder combination 62 through a conduit 92 and by telescoping tubes 93 and 94 (Figure 6). Such a telescoping arrangement is necessary to permit mounting of the conduit 92 on the top plate 26 and allow for the relative axial reciprocation of the piston-cylinder elements 29—30. The tube 93 is threaded into the cap 37 and secured in place by a lock-nut 95. The tube 94 is threaded above an annular shoulder 96 and is secured to the top plate 26 of the supporting frame A by a lock-nut 96a.

The air-pressure control-valve 63 is interposed between a lead 97 from a source of air pressure (not shown) and air lines 98 and 99 leading respectively to the piston-cylinder-combination B and the auxiliary piston-cylinder combination 62 (Figure 21).

The air line 98 is connected to the cylinder element 30 by telescoping tubes 100 and 101 in quite the same form as the previously-described oil tubes 93 and 94. The tube 100 is threaded into the cylinder head 37 and secured in place by a lock-nut 102. The tube 101 connects with a channel 103 in the cylinder head 37 which communicates with the piston cavity of the cylinder element 30 through a port 104 (Figure 7). The tube 101 is threaded above an annular shoulder 105 and secured to the supporting-frame top plate 26 by a lock-nut 106. Such a telescoping tube arrangement is necessary to permit mounting the air line 98 on the top plate 26 and allow for a connection to the reciprocating cylinder element 30.

The air line 99 is connected to the auxiliary piston-cylinder combination 62 and thereby constitutes the force which creates the requisite oil pressure for effecting the relative reciprocation of the primary piston-cylinder combination B.

The switches 64 and 65 are normally open and arranged on the top plate 26 in position to be actuated by the piston-cylinder elements 29 and 30 when the cylinder element is at the opposite extremes of its reciprocation, as will be explained more fully presently. One or both of the switches 64 and 65—but especially 65—may be of the conventional delayed-action type so that where a plurality of these machine tool control mechanisms are being used (in a manner known in the art) on a turn-table type of forming machine, the actual closing of all the switches 64—and/or 65—occurs simultaneously.

It is to be noted from the foregoing that the power drive connection for the tool spindle, and the air, oil and electrical connections for the control mechanism are made at the upper end of the mechanism at the top side of the plate 26, so that all of the connections are disposed remotely of the work area to avoid obstruction of that area, and in a location where all may be enclosed within a suitable housing (not shown herein) to be shielded thereby from damage.

The valve 63 is a four way valve oppositely actuated by a pair of solenoids 107 and 108 controlled respectively by the switches 64 and 65 (see Figure 21). The opposite shifting of the valve 63 by the solenoids 107 and 108 admits air pressure to one or the other of the lines 98 and 99 and bleeds the other to atmosphere through the outlet 132.

The solenoid 107 is activated by the switch 64 when the cylinder element 30 has pressed the tool in the tool holder C to the limit of its movement into the work. At the moment when that occurs, the oil pressure acting against the piston element 29 causes the piston to move upwardly against the opposing force of the spring 36 whereupon the bolt 34 operates the switch 64 to close the circuit to the solenoid 107 and effect a shifting of the valve device 63 to reverse the pressure of the air from the conduit 99 and the piston-cylinder combination 62 to the conduit 98 and the piston-cylinder elements 29 and 30.

Figure 5:
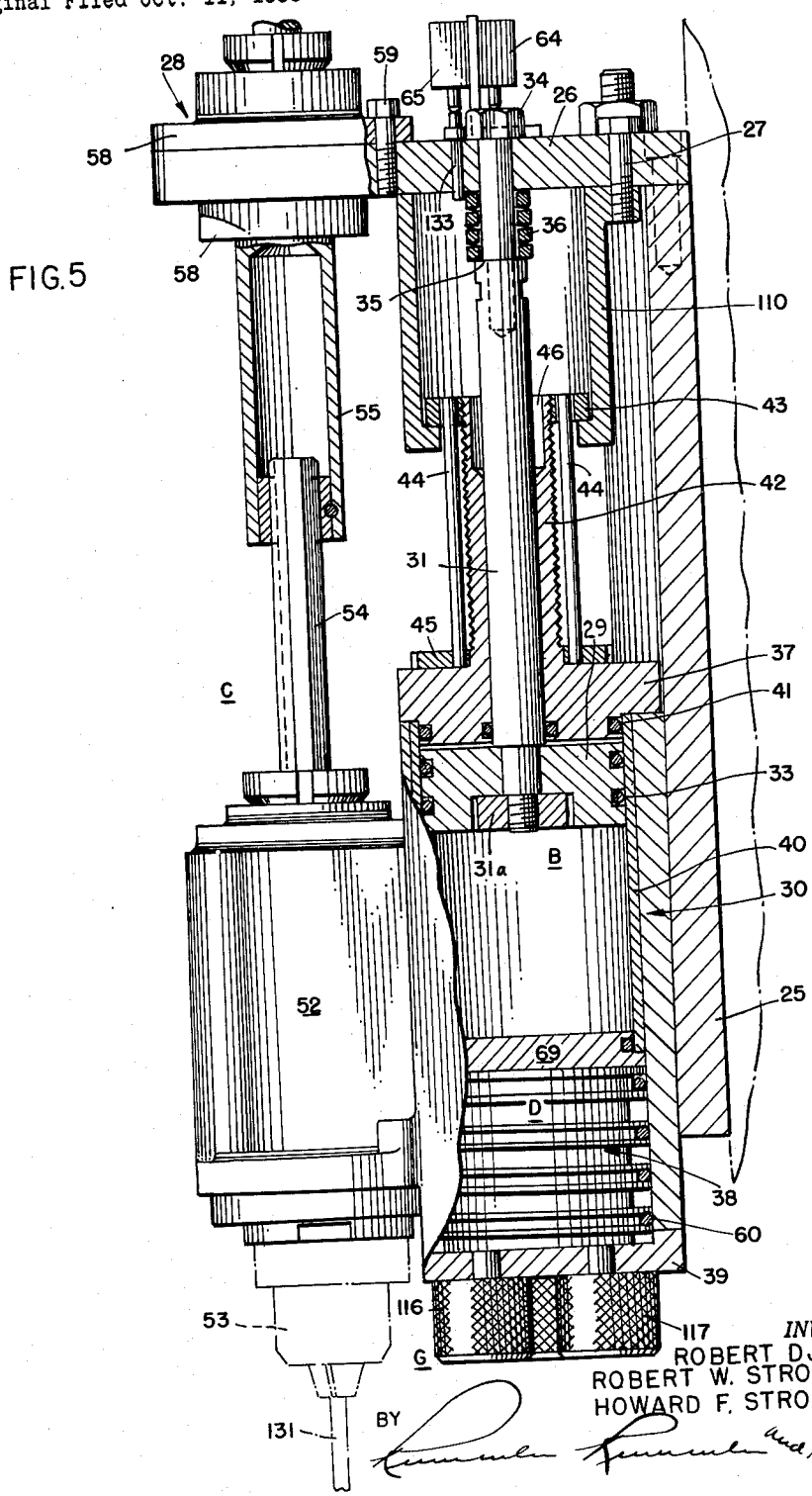
Figure 5 is a view similar to Figure 4 but showing the parts in an opposite extreme position from that shown in Figure 4.
Figure 10:
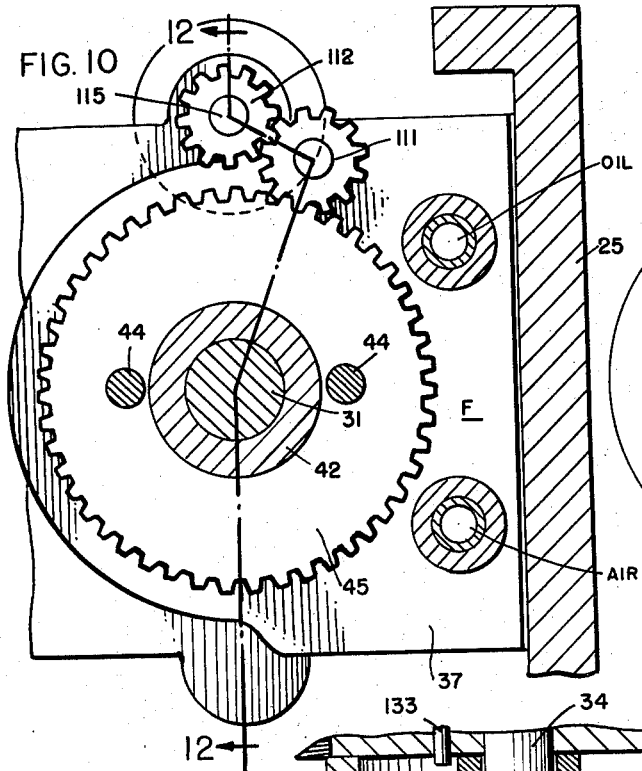
Figure 10 is a transverse, cross-sectional view of the manually-adjustable stroke-regulating mechanism, the view being taken on line 10—10 of Figure 4.
Figure 11:
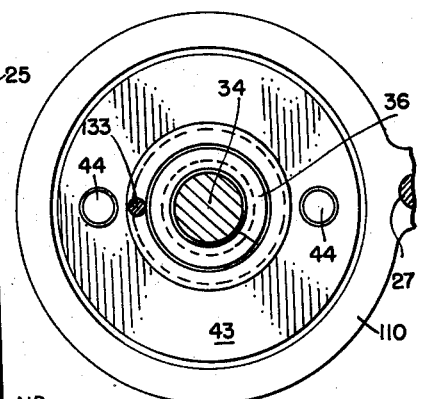
Figure 11 is another transverse, cross-sectional view of said mechanism, this view being taken on line 11—11 of Figure 4.
Figure 12:
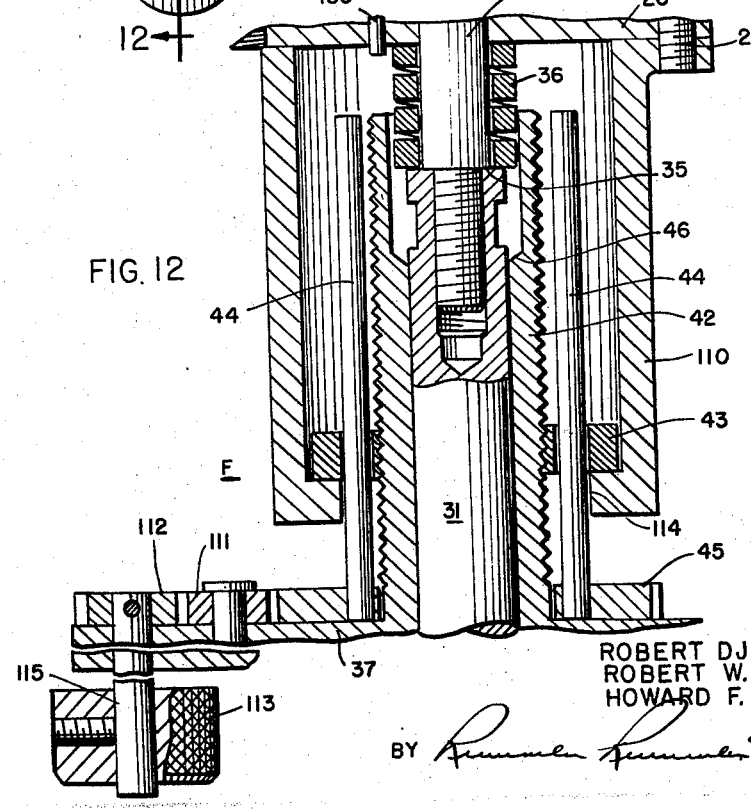
Figure 12 is a vertical section of this same mechanism, the view being taken substantially on line 12—12 of Figure 10.

The solenoid 108 is activated by the switch 65 when the cylinder element 30 reaches the upper limit of its travel. At that instant, the upper end of the extension 42 on the cylinder element 30 contacts a floating pin 133 (see Figures 4, 5 and 21), slidingly supported in the top plate 26, and causes the pin 133 to operate the switch 65 thereby closing the circuit to the solenoid 108 and reversing the valve device 63.

The stroke-adjusting mechanism F is best shown in Figures 4, 5, 10, 11, and 12. It comprises the herein-before described ring 43, rods 44 and gear 45, an internally flanged or cup-like member 110, pinions 111 and 112, and an operating knob 113.

The member 110, which is of cylindrical form, is suspended from the under side of the top plate 26 and encloses the ring 43 and the rods 44. At its lower end, the member 110 is formed with an inwardly-extending annular flange 114 which limits the axial movement of the ring 43 on the threaded extension 42. The pinions 111 and 112 are journalled on the cylinder support head 37 in mesh with each other and the former in mesh with the gear 45. The latter pinion 112 is secured to the operating knob 113 by a shaft 115 which extends longitudinally along side the cylinder 30 to the lower end thereof. Turning of the knob 113 rotates the gear 45 and effects a rotative axial movement of the ring 43 on the threaded extension 42. The position of the ring 43 with relation to the flange 114 determines the over-all stroke of the respectively-reciprocating piston-cylinder elements 29 and 30. This, in turn, determines the vertical movement of the tool holder C and the tool with relation to the work. It is to be appreciated that when the ring 43 engages the flange 114, the cylinder is held against further movement in the tool advancing direction, whereupon the piston 29 is actuated to effect reversal of fluid flow and retraction of the cylinder.

The cylinder speed-adjusting mechanism G is mainly associated with the valve head 38 and comprises the slide valves 84 and 85 and the cam mechanism 61.

The valves 84 and 85 are adjustable by respective knobs 116 and 117, thereby to vary the rate of flow through the vertical flow paths 77 and 78. The knobs 116 and 117 (Figure 14) are respectively keyed to the outer ends of the slide valves 84 and 85 which are threaded at 118 and 118' for rotative axial movement in sleeves 119 and 119' secured in the block 67. Turning of the knobs positions the upper V-slot ends 89 and 89' of the valves 84 and 85 to control the facility of oil flow through the respective ports 77 and 78. At their upper ends, the sleeves 119 and 119' have annular pockets 120 and 120' which register with the annular peripheral grooves 70 and 71, respectively, in the block 67. The flow of oil through these pockets 120 and 120', between the connecting grooves 70 and 71 and ports 77 and 78 and 91 and 91', is regulated by the axial position of the V-slots 89 and 89'.

The cam mechanism 61 comprises a bell-crank lever 121 pivoted at 122 (see Figure 8) on the cylinder element 30. The lever 121 is so positioned that one arm 123 contacts the exposed end of a stem 124 on the valve 88. The other arm 126 mounts a roller 125 to contact a cam slide 127 adjustable on the standard 25 of the supporting frame A.

Figure 1:
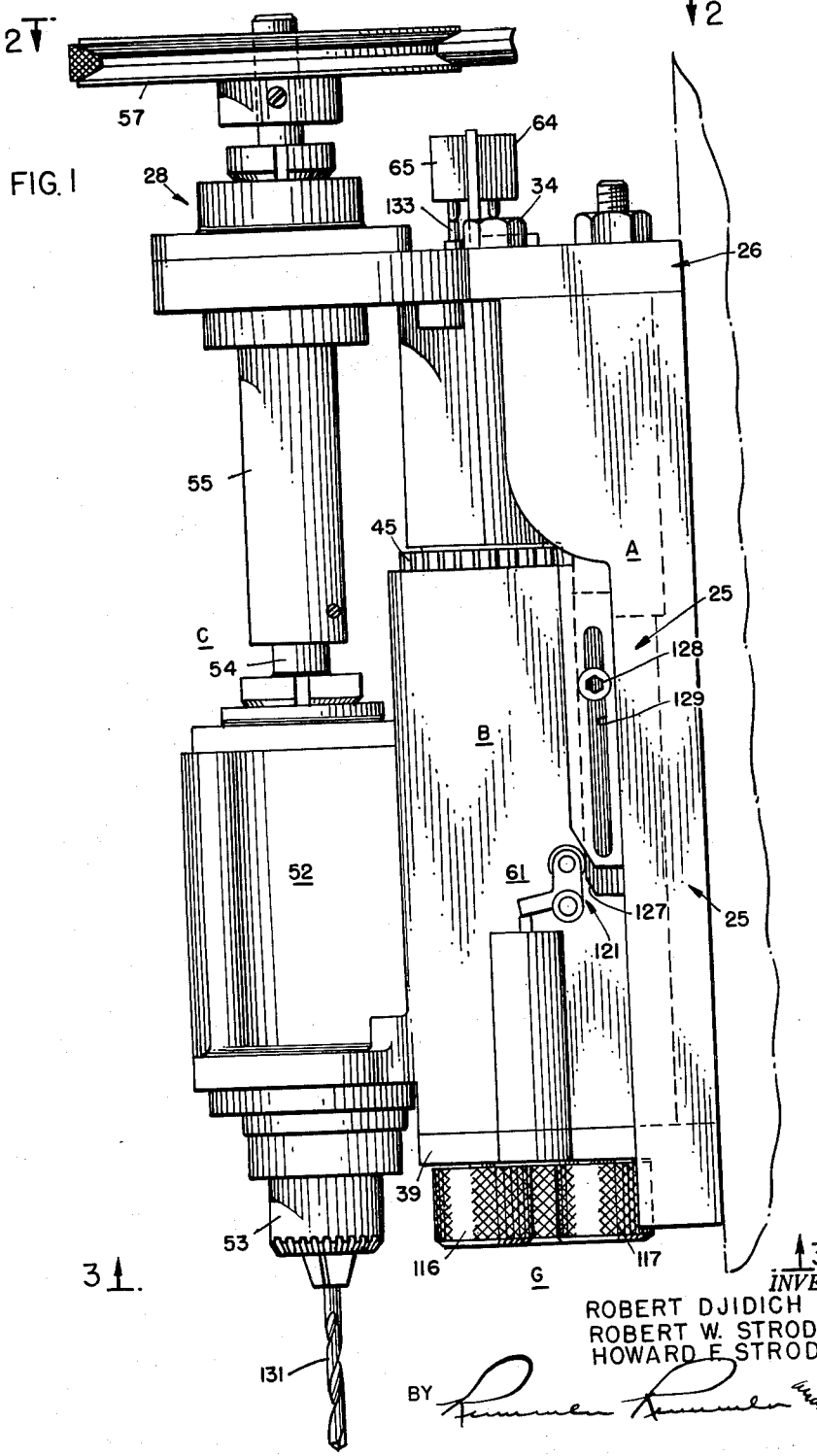
Figure 1 is a side elevation of a machine tool control mechanism constructed in accordance with this invention.

The cam slide 127 is held in place by an appropriate clamping nut and bolt 128 (Figure 1) slidable in a slot 129 in the standard 25. This permits the cam slide 127 to be shifted to vary the point at which the roller 25 is disengaged from and engaged with the inclined nose portion 130 of the slide, whereby actuation of the by-pass valve 88 may be correlated to the work and to the stroke of the relatively reciprocating piston and cylinder elements 29 and 30, as determined by the stroke-adjusting mechanism F previously described.

Here it is to be noted that all of the means for adjusting the stroke and the speed of the mechanism are located adjacent the lower end of the mechanism at one side of the work area, whereby all of the manually adjustable elements are disposed for convenient access by the operator or set-up man. In particular, the three adjusting knobs 113, 116 and 117 are disposed immediately at the lower end of the cylinder to facilitate precise adjustment relative to the work of the end point of tool travel and the rates of entry and withdrawal of the tool into and out of the work. Also, the location of the manual adjusting means at the lower end of the cylinder and the location of the oil, air and electrical connections at the upper end of the cylinder affords a particularly convenient arrangement whereby the control instrumentalities are not obstructed by the connections and whereby the connections are not subject to damage by a person trying to gain access to the control instrumentalities.

The operation of our improved machine tool control mechanism is as follows:

A cutting tool, as for example, a drill 131, is appropriately locked in the chuck 53 of the tool holder C. The machine is made ready to have pieces of work successively placed in and removed from a position to be acted upon by the tool 131. This may be done automatically or manually or by a combination of automatic-manual action.

The knob 113 is turned to cause the gear 45 to rotate the ring 43 (Figure 12) on the threaded extension 42. This positions the ring 43 a predetermined axial distance from the flange 114 on the member 110, and thereby determines the stroke of the tool 131 relative to the work pieces.

The slide 127 is then adjusted so that the wheel 125 becomes disengaged from the same just before the tool 131 will engage the work pieces, whereby the by-pass valve 88 will be closed just before, or at approximately the same time as, the tool engages the work and will be opened whenever the tool is above the level of the work.

Also the knobs 116 and 117 are turned to axially shift the slide valves 84 and 85 to so position the V-slots 89 and 89' as will predetermine the freedom of oil flow to and from the piston-cylinder combination B via the restricted ports 91 and 91', and consequently determine the speeds of movement of the tool 131 into and out of the work piece.

With the adjustments made, the machine is ready to be put into operation for continuous automatic advance and withdrawal of the tool 131 relative to each piece of work successively placed in position on the machine. To start the machine, a master valve 134 for the air pressure source is opened, and master switches 135 and 136 for the circuits to the solenoids 107 and 108 are closed.

The opening of the valve 134 results in the auxiliary piston-cylinder combination 62 being actuated to force oil through the conduit 92 into the cylinder element 30 below the piston element 29. Thereupon the cylinder element 30 begins to move downwardly, first rapidly to the work and then slowly into the work.

This successive rapid-slow advance of the tool holder C is determined by the oil flow paths through the grooves and ports in the oil control head 38, as affected by the cam mechanism 61. At the starting and ending portions of the reciprocatory travel of the cylinder, the roller 125 is in contact with the vertical face of the cam slide 127 thereby to hold the valve 88 open. During the working part of the stroke, the roller is disengaged from the slide, at which time the valve 88 is closed.

As Figure 17 shows by its arrows, the oil flow path initially is from the oil channel 86 through the groove 71, port 74, groove 72, oil channel 87, groove 70, and then ports 73 and 90 into the cylinder element 30 below the piston element 29. This is a relatively unrestricted path accommodating free flow of oil and rapid advance of the cylinder, which continues until the tool 131 is nearly ready to contact a work piece. At that instant, the roller 125 traverses the incline 130 of the adjustable cam slide 127 and permits the spring valve 88 to close the oil channel 87. Thereupon the oil flow is instantly checked by being required to now enter the cylinder element through the V-slot 89' of the slide valve 85.

As Figure 18 shows by its arrows, the oil flow now is from the oil channel 86 through the groove 71, pocket 120', V-slot 89', and port 91'. Since the V-slot 89' introduces a restriction in the path of oil flow, the cylinder now moves at a reduced speed to feed the tool 131 into the work at a predetermined rate so that the tool may effect the required shaping of a work piece.

When the ring 43 engages the stationary flange 114, the cylinder is stopped and the tool 131 completes its shaping of the work piece. The oil in the cylinder element 30, by virtue of increase in pressure, then causes upward movement of the piston 29 and its rod 31 against the force of the spring 36 to close the switch 64. This closes the circuit to the solenoid 107 with a consequent shifting of the valve device 63 and transfer of air under pressure to the line 98 and venting of the line 99 to atmosphere.

Air under pressure now is supplied to the cylinder element 30 above the piston element 29, which reverses the oil flow from the piston-cylinder combination B to the auxiliary piston-cylinder combination 62. Thereupon, there is first a slow retraction of the cylinder until the tool 131 leaves the work piece and then a rapid movement of the cyinder to its fully-retracted position.

The successive slow-rapid retraction of the tool holder C, as before, is determined by the oil flow through the ports and grooves of the oil control head 38, as influenced by the cam mechanism 61. At the beginning of the retraction of the tool holder C, the roller 125 is disengaged from the cam slide 127 and the oil channel 87 remains closed by the spring biased valve 88.

As Figure 19 shows by its arrows, the oil flow now is through the port 91, past the V-slot 89 in the slide valve 84, through the pocket 120, groove 70 and port 76 into the groove 71 and out through the oil channel 86. Since the V-slot 89 imposes a restriction in the path of oil flow, initial retraction of the cylinder is relatively slow so as to withdraw the tool at a selected speed from the work. When the roller 125 is brought into engagement with the incline 130 on the cam slide 127, the spring valve 88 is opened, at which time the tool 131 is freed from the work piece.

As Figure 20 shows by its arrows, the oil flow now is through the port 90' and port 75 into the groove 72, thence to the oil channel 87, the groove 70 and the port 76 into the groove 71 and out through the oil channel 86. This path is relatively unrestricted, whereby the cylinder is returned rapidly to its initial position.

As the cylinder element 30 approaches the extreme of its fully-retracted position, the end of the extension 42 contacts the floating pin 133 and causes it to close the switch 65. This energizes the solenoid 108 and effects a quick shifting of the valve device 63 to cut off the pressure through the line 98 and open it to the line 99. Thereupon the above described cycle is repeated. Such repetition continues automatically until all of the work pieces have been uniformly shaped. That being achieved, the switches 135 and 136 are opened and the valve 134 is closed, whereupon the machine comes to rest.

Subsequently, if conditions require, the knob 113 of the stroke-adjusting mechanism F, the knobs 116 and 117 of the slow-rapid speed adjusting mechanism G and/or the cam mechanism 61 may be adjusted to obtain a different relative timing of the rapid-slow advance and slow-rapid return of the tool holder C.

The foregoing operative description pertains to but one of these improved machine tool control mechanisms herein set forth. In the event several such mechanisms are used on a turn-table type of forming machine, to perform different operations on work pieces, each such mechanism will operate in the manner above explained. However, by reason of the use of a delayed-action type of switch for the switches 64 and/or 65, the advance of all of the several tools would occur simultaneously.

From the foregoing, it is to be appreciated that the present invention provides an improved and exceptionally compact machine tool control mechanism that is readily adjusted to accommodate any selected stroke, working speed and withdrawal speed desired for the tool, and to effect rapid movement of the tool in the non-working portions of its stroke, all automatically. In particular, the invention provides a compact and readily replaced valve block assembly including means for independently controlling the speeds of the cylinder in opposite directions, an improved structural arrangement of means for varying the stroke of the mechanism, an improved structural arrangement of means for effecting alternate application of fluid pressure to the mechanism, an improved coaxial assembly of the components of the mechanism contributing to its compactness, and a mechanism wherein the power supply connections are all made at a location remote from the work area and the adjustable means are all located adjacent the work area at one side thereof to enhance the usefulness and servicability of the mechanism. Thus, all of the objects and advantages of the invention have been shown herein to be attained in a convenient, economical and practical manner.

While we have shown and described what we regard to be the preferred embodiment of our invention, it will be appreciated that various changes, rearrangements and modifications may be made therein without departing from the scope of the invention, as defined by the appended claims.

We claim:

1. In a machine tool having a supporting frame, coacting piston-cylinder elements mounted on the frame for relative axial reciprocation, and a hydraulic pressure system connected to effect the opposite relative reciprocation of the piston-cylinder elements, the improvement comprising a cylindrical block located in the cylinder element and having a plurality of annular grooves and transverse port variously interconnecting the grooves with each other to provide dual flow paths to and from the space between the cylindrical block and the opposed face of the piston element, a channel in the cylinder element connecting one of the cylindrical-block grooves with the hydraulic pressure system, a second channel in the cylinder element connecting other cylindrical-block grooves with each other, automatically-acting valves positioned in certain of the cylindrical-block ports for controlling the opposite flow through the grooves and ports between the piston-cylinder elements and the hydraulic pressure system, a spring-biased valve normally closing the second channel, and cam mechanism actuated by the opposite relative reciprocation of the piston-cylinder elements for shifting the spring-biased valve to determine the flow through the dual flow paths.

2. In a machine tool having a supporting frame, coacting piston-cylinder elements mounted on the frame for relative axial reciprocation, and a hydraulic pressure system connected to effect the opposite relative reciprocation of the piston-cylinder elements, the improvement comprising a cylindrical block located in the cylinder element and having a plurality of annular grooves and transverse ports variously interconnecting the grooves with each other to provide dual flow paths to and from the space between the cylindrical block and the opposed face of the piston element, a channel in the cylinder element connecting one of the cylindrical-block grooves with the hydraulic pressure system, a second channel in the cylinder element connecting other cylindrical-block grooves with each other, automatically-acting valves positioned in certain of the cylindrical-block ports for controlling the opposite flow through the grooves and ports between the piston-cylinder elements and the hydraulic pressure system, a pair of shiftable valves positioned in two of the cylindrical-block ports, knobs connected to each of the shiftable valves to permit manual adjustment thereof for varying the freedom of flow through one of the dual flow paths, a spring-biased valve normally closing the second channel, and cam mechanism actuated by the opposite relative reciprocation of the piston-cylinder elements for shifting the spring-biased valve to determine the flow through the dual flow paths.

3. A machine tool comprising, a supporting frame, a piston element, a piston-element rod suspending the piston element from the supporting frame, a piston-embracing cylinder slidably mounted on the supporting frame for reciprocation relative to the piston element, a support head secured in one end of the cylinder element outwardly of the piston element and slidable on the piston-element rod, a hydraulic pressure system connected to the cylinder element on opposite sides of the piston element, means for alternating the application of the hydraulic pressure system to the cylinder element on opposite sides of the piston element to effect the opposite reciprocation of the cylinder element, a threaded reduced-diameter extension on the cylinder-element head, a gear journalled on the cylinder-element head concentrically of the extension, a ring internally threaded for rotative axial movement on the threaded extension, rods mounted on the gear and telescoping with the ring whereby a rotation of the gear effects an axial movement of the ring on the extension, a flange on the supporting frame disposed intermediate the gear and the ring for contacting the ring to limit the movement of the cylinder element relative to the piston element, and means for turning the gear to vary the axial position of the ring on the extension with respect to the frame flange.

4. A machine tool comprising, a supporting frame, a primary piston-cylinder combination mounted on the frame for relative axial reciprocation, an auxiliary piston-cylinder combination, an oil pressure system connecting the two cylinders so that the displacement of the oil by the relative movement of one piston-cylinder combination effects the opposite relative movement of the other piston-cylinder combination, an air pressure system connected to the respective cylinders in opposition to the oil pressure connections to initiate the relative reciprocation of the piston-cylinder combinations, a cylindrical block located in the cylinder of the primary piston-cylinder combination and having a plurality of annular grooves and transverse ports interconnecting the grooves with each other to provide dual oil flow paths in the oil pressure system, a channel in the cylinder of the primary piston-cylinder combination connecting one of the cylindrical-block grooves with the oil pressure system, a second channel in the same cylinder connecting other cylindrical-block grooves with each other, automatically-acting valves positioned in certain of the cylindrical-block ports for controlling the opposite oil flow through the grooves and ports, a spring-biased valve normally closing the second channel, cam mechanism actuated by the opposite relative reciprocation of the primary piston-cylinder combination for shifting the spring-biased valve to determine the flow through the dual oil flow paths, means for alternating the application of air pressure to the respective piston-cylinder combinations, and means actuated by the primary piston-cylinder combination at the opposite limits of the relative reciprocation thereof for controlling the said air pressure alternating means.

5. A machine tool comprising, a supporting frame, a primary piston-cylinder combination mounted on the frame for relative axial reciprocation, an auxiliary piston-cylinder combination, an oil pressure system connecting the two cylinders so that the displacement of the oil by the relative movement of one piston-cylinder combination effects the opposite relative movement of the other piston-cylinder combination, an air pressure system connected to the respective cylinders in opposition to the oil pressure connections to initiate the relative reciprocation of the piston-cylinder combinations, a cylindrical block located in the cylinder of the primary piston-cylinder combination and having a plurality of annular grooves and transverse ports interconnecting the grooves with each other to provide dual oil flow paths in the oil pressure system, a channel in the cylinder of the primary piston-cylinder combination connecting one of the cylindrical-block grooves with the oil pressure system, a second channel in the same cylinder connecting other cylindrical-block grooves with each other, automatically-acting valves positioned in certain of the cylindrical-block ports for controlling the opposite oil flow through the grooves and ports, a pair of shiftable valves positioned in two of the cylindrical-block ports, knobs connected to each of the shiftable valves to permit manual adjustment thereof for varying the freedom of flow through the dual oil flow paths, a spring-biased valve normally closing the second channel, cam mechanism actuated by the opposite relative reciprocation of the primary-cylinder combination for shifting the spring-biased valve to determine the flow through the dual oil flow paths, means for alternating the application of air pressure to the respective piston-cylinder combinations, and means actuated by the primary piston-cylinder combination at the opposite limits of the relative reciprocation thereof for controlling the said air pressure alternating means.

6. A machine tool comprising, a supporting frame, a piston suspended by a piston rod from the supporting frame, a piston-embracing cylinder slidably mounted on the supporting frame for reciprocation relative to the piston, a support head secured in one end of the cylinder outwardly of the piston and slidable on the piston rod, an auxiliary piston-cylinder combination, an oil pressure system connecting the two cylinders so that the displacement of oil from one piston-cylinder combination effects the opposite relative reciprocation of the other piston-cylinder combination, an air pressure system connected to the respective cylinders in opposition to the oil pressure connections to initiate the relative reciprocation of the piston-cylinder combinations, a cylindrical block located in the other end of the first above-mentioned cylinder and having a plurality of annular grooves and transverse ports interconnecting the grooves with each other to provide dual flow paths in the oil pressure system, a channel in the first-mentioned cylinder connecting one of the cylindrical-block grooves with the oil pressure system, a second channel in the same cylinder connecting other grooves with each other, automatically-acting valves positioned in certain of the cylindrical-block ports for controlling the opposite flow through the grooves and ports, a valve controlling flow through the second channel, means actuated by the opposite relative reciprocation of the first-mentioned piston-cylinder combination for controlling the second channel valve to determine the flow through the dual flow paths, means for alternating the application of air pressure to the cylinders, and means actuated by the first-mentioned piston-cylinder combination at the opposite limits of the relative reciprocation thereof for controlling the air pressure alternating means.

7. A machine tool comprising, a supporting frame, a piston suspended by a piston rod from the supporting frame, a piston-embracing cylinder slidably mounted on the supporting frame for reciprocation relative to the piston, a support head secured in one end of the cylinder outwardly of the piston and slidable on the piston rod, a threaded reduced diameter extension on the cylinder head, a gear journalled on the cylinder head concentrically of the extension, a ring internally threaded for rotative axial movement on the threaded extension, rods mounted on the gear and telescoping with the ring whereby a rotation of the gear effects an axial movement of the ring on the extension, a flange on the supporting frame disposed intermediate the gear and the ring for engagement by the ring for limiting the stroke of the cylinder relative to the piston, means for turning the gear to vary the axial position of the ring on the extension with respect to the frame flange, an auxiliary-piston cylinder combination, an oil pressure system connecting the two cylinders so that the displacement of oil from one piston-cylinder combination effects the opposite relative reciprocation of the other piston-cylinder combination, an air pressure system connected to the respective cylinders in opposition to the oil pressure connections to initiate the relative reciprocation of the piston-cylinder combinations, a cylindrical block located in the other end of the first-mentioned cylinder and having a plurality of annular grooves and transverse ports interconnecting the grooves with each other to provide dual flow paths in the oil pressure system, a channel in the first-mentioned cylinder connecting one of the cylindrical-block grooves with the oil pressure system, a second channel in the same cylinder connecting other grooves with each other, automatically-acting valves positioned in certain of the cylindrical-block ports for controlling the opposite flow through the grooves and ports, a valve-controlling flow through the second channel, means actuated by the opposite relative reciprocation of the first-mentioned piston-cylinder combination for controlling the second channel valve to determine the flow through the dual flow paths, means for alternating the application of air pressure to the cylinders, and means actuated by the first-mentioned piston-cylinder combination at the opposite limits of the relative reciprocation thereof for controlling the air pressure alternating means.

8. A machine tool comprising, a supporting frame, a piston suspended by a piston rod from the supporting frame, a piston-embracing cylinder slidably mounted on the supporting frame for reciprocation relative to the piston, a support head secured in one end of the cylinder outwardly of the piston and slidable on the piston rod, a threaded reduced-diameter extension on the cylinder head, a gear journalled on the cylinder head concentrically of the extension, a ring internally threaded for rotative axial movement on the threaded extension, rods mounted on the gear and telescoping with the ring whereby a rotation of the gear effects an axial movement of the ring on the extension, a flange on the supporting frame disposed intermediate the gear and the ring for contacting the ring for limiting the stroke of the cylinder relative to the piston, means for turning the gear to vary the axial position of the ring on the extension with respect to the frame flange, an auxiliary piston-cylinder combination, an oil pressure system connecting the two cylinders so that the displacement of oil from one piston-cylinder combination effects the opposite relative reciprocation of the other piston-cylinder combination, an air pressure system connected to the respective cylinders in opposition to the oil pressure connections to initiate the relative reciprocation of the piston-cylinder combinations, a cylindrical block located in the other end of the first above-mentioned cylinder and having a plurality of annular grooves and transverse ports interconnecting the grooves with each other to provide dual flow paths in the oil pressure system, a channel in the first-mentioned cylinder connecting one of the cylindrical-block grooves with the oil pressure system, a second channel in the same cylinder connecting other grooves with each other, automatically-acting valves positioned in certain of the cylindrical-block ports for controlling the opposite flow through the grooves and ports, a spring-biased valve normally closing the second channel, cam mechanism actuated by the opposite reciprocation of the cylinder on the supporting frame for shifting the spring-biased valve to determine the flow through the dual flow paths, means for adjusting the cam mechanism to synchronize its action with the positioning of the first-mentioned cylinder stroke-limiting ring, means for alternating the application of air pressure to the cylinders, and means actuated by the first-mentioned piston-cylinder combination at the opposite limits of the relative reciprocation thereof for controlling the air pressure alternating means.

9. A machine tool comprising, a supporting frame, a piston suspended by a piston rod from the supporting frame, a piston-embracing cylinder slidably mounted on the supporting frame for reciprocation relative to the piston, a support head secured in one end of the cylinder outwardly of the piston and slidable on the piston rod, a threaded reduced-diameter extension on the cylinder head, a gear journalled on the cylinder head concentrically of the extension, a ring internally threaded for rotative axial movement on the threaded extension, rods mounted on the gear and telescoping with the ring whereby a rotation of the gear effects an axial movement of the ring on the extension, a flange on the supporting frame disposed intermediate the gear and the ring for contacting the ring for limiting the stroke of the cylinder relative to the piston, means for turning the gear to vary the axial position of the ring on the extension with respect to the frame flange, an auxiliary piston cylinder combination, an oil pressure system connecting the two cylinders so that the displacement of oil from one piston-cylinder combination effects the opposite relative reciprocation of the other piston-cylinder combination, an air pressure system connected to the respective cylinders in opposition to the oil pressure connections to initiate the relative reciprocation of the piston-cylinder combinations, a cylindrical block located in the first above-mentioned cylinder and having a plurality of annular grooves and transverse ports interconnecting the grooves with each other to provide dual flow paths in the oil pressure system, a channel in the first-mentioned cylinder connecting one of the cylindrical-block grooves with the oil pressure system, a second channel in the same cylinder connecting other grooves with each other, automatically-acting valves positioned in certain of the cylindrical-block ports for controlling the opposite flow through the grooves and ports, a spring-biased valve normally closing the second channel, a cam lever hinged on the first-mentioned cylinder and positioned to retract the spring-biased valve to determine the flow through the dual oil paths, a cam plate on the supporting frame for actuating the cam lever, means for adjusting the cam plate to synchronize the action of the cam lever with the first-mentioned cylinder-stroke limiting ring, a solenoid-operated valve interposed in the air pressure system for alternating the application of air pressure to the respective cylinders, a pair of normally open switches connected to the solenoid and positioned on the supporting frame to be respectively actuated by the first-mentioned piston rod and cylinder at the opposite extremes of the reciprocation of the cylinder, a compression spring interposed between the frame and the piston-element rod to allow for slight axial movement of the piston rod relative to the frame to actuate one of the switches, and an axially-shiftable pin eccentrically disposed with respect to the piston rod to be engaged by the cylinder element to actuate the other switch.

10. A machine tool comprising, a supporting frame, a piston element, a piston-element rod supporting the piston element on the frame, a piston-embracing cylinder slidably mounted on the frame for reciprocation relative to the piston element, a head secured to the ends of the cylinder element outwardly of the piston element and slidable on the piston-element rod, a hydraulic-pressure system connected to the cylinder element on opposite sides of the piston element, electrically-operable means for alternating the application of the hydraulic-pressure system to the cylinder element to effect the opposite reciprocation of the cylinder element, a pair of normally-open switches for controlling the electrically-operable means positioned on the frame to be respectively actuated by movement of the piston rod and the cylinder element at the opposite extremes of its reciprocation, a compression spring interposed between the frame and the piston element rod to allow for slight axial movement of the piston rod relative to the frame to actuate one of the switches, and an axially-shiftable pin eccentrically disposed with respect to the piston rod to be engaged by the cylinder element to actuate the other switch.

11. In a power feed mechanism for machine tools having a supporting frame, a piston rod carried by said frame, a piston element secured to said rod, a cylinder element slidably mounted on said piston element and said frame, a fluid pressure system for effecting relative reciprocation of said elements and control apparatus actuated in response to the relative reciprocation of said elements for alternating the application of fluid pressure thereto, the improvement comprising means mounting said piston rod for limited axial movement on said frame, a stop for limiting movement of said cylinder element in the direction away from said rod, and means biasing said rod towards said cylinder element, said rod being operatively associated with said control apparatus, said means accommodating limited movement of said piston element and said rod when said cylinder element engages said stop for effecting actuation of said control apparatus.

12. In a power feed mechanism for machine tools having a supporting frame, a piston rod carried by said frame, a piston element secured to said rod, a cylinder element slidably mounted on said piston element and said frame, a fluid pressure system for effecting relative reciprocation of said elements and control apparatus actuated in response to the relative reciprocation of said elements for alternating the application of fluid pressure thereto, the improvement comprising a support secured to said frame and extending transversely of said rod at the end of the rod opposite said piston element, means mounting said piston rod for limited axial movement on said support, a stop for limiting movement of said cylinder element in the direction away from said support, means biasing said rod away from said support toward said cylinder element, said control apparatus including a control instrumentality mounted on said support adjacent said rod, said means accommodating limited movement of said piston element and said rod when said cylinder element engages said stop for effecting actuation of said control instrumentality, and an extension on said cylinder element engageable with said control instrumentality for actuating the same when said cylinder element approaches said support.

13. In a power feed mechanism for a machine tool including relatively reciprocable piston and cylinder elements, a fluid pressure system for effecting relative reciprocation of said elements and control means for said system, the improvment comprising that said control means includes a valve assembly having a plurality of ports therein variously establishing communication between said system and the interior of said cylinder, said ports defining parallel paths of fluid flow including a pair of restricted paths and a pair of relatively unrestricted paths, one-way valve means in each of said paths, the one-way valve means in one each of said restricted paths and said unrestricted paths accommodating fluid flow in one direction and the valve means in the other paths accommodating fluid flow in the other direction, one of said pairs of paths communicating with said system, a by-pass for establishing communication between the other pair of paths and said system, valve means in said by-pass for controlling flow therethrough, and means operative in response to relative reciprocation of said piston and cylinder elements for opening and closing the last-named valve means during respective portions of the relative reciprocation of said elements, whereby the elements have selected speeds operation in both directions of relative reciprocation.

14. In a power feed mechanism as set forth in claim 13, adjustable orifice means in each of said restricted paths and means for independently adjusting each of them.

15. In a power feed mechanism for a machine tool including relatively reciprocable piston and cylinder elements and a fluid pressure system for effecting relative reciprocation of said elements, the improvement comprising a cylindrical block slidably inserted in one end of the cylinder element and having a plurality of annular grooves in the wall thereof and a plurality of ports therein variously interconnecting the grooves and communicating with the cylinder, first channel means in said cylinder element for connecting one of said grooves with the fluid pressure system, said ports defining parallel paths of fluid flow including a pair of restricted paths and a pair of relatively unrestricted paths, one-way valve means in each of said paths, the one-way valve means in one each of said restricted paths and said unrestricted paths accommodating fluid flow in one direction and the valve means in the other paths accommodating fluid flow in the other direction, one of said pairs of paths communicating with said one groove, second channel means in said cylinder element connecting certain of said grooves for establishing communication between the other pair of paths and said one groove, valve means in said second channel means for controlling flow therethrough, and means operative in response to relative reciprocation of said piston and cylinder elements for opening and closing the last-named valve means during respective portions of the relative reciprocation of said elements, whereby the elements have selected speeds of operation in both directions of relative reciprocation.

16. In a power feed mechanism for machine tools, a supporting frame, a piston suspended by an axial piston rod from the supporting frame, a piston-embracing cylinder slidably mounted on the supporting frame coaxially of said rod for reciprocation relative to the piston, a head secured in one end of the cylinder outwardly of the piston and slidable on the piston rod, a threaded axial extension of reduced diameter on the cylinder head, a gear journalled on the cylinder head concentrically of the extension, a ring coaxial with and internally threaded for rotative axial movement on the threaded extension, rods mounted on the gear and telescoping with the ring whereby rotation of the gear effects axial movement of the ring on the extension, a flange on the supporting frame concentric with said piston rod and disposed intermediate the gear and the ring for engagement by the ring for limiting the stroke of the cylinder relative to the piston, means for turning the gear to vary the axial position of the ring on the extension with respect to the frame flange, a fluid pressure system for effecting reciprocation of said piston and said cylinder including a valve assembly for controlling the rate of flow of fluid into and out of the cylinder, said valve assembly comprising a cylindrical block fitted axially into the other end of said cylinder, whereby the mechanism comprises a compact coaxial assembly.

17. In a power feed mechanism for machine tools, a frame including a standard and a transverse support, a piston rod carried adjacent one end by said support, a piston secured to the other end of said rod axially thereof, a piston-embracing cylinder coaxial with said rod and slidably mounted on said standard, a head secured in the end of the cylinder adjacent the support, said head being slidable on the piston rod, a threaded axial extension of reduced diameter projecting toward said support from the cylinder head, a gear journalled on the cylinder head concentrically of the extension, a ring coaxial with and internally threaded for rotative axial movement on the threaded extension, rods mounted on the gear and telescoping with the ring whereby rotation of the gear effects axial movement of the ring on the extension, an annular flange on the supporting frame concentric with said piston rod and disposed intermediate the gear and the ring for engagement by the ring for limiting the stroke of the cylinder relative to the piston, a rotatable shaft operatively associated with said gear and extending therefrom toward the other end of the cylinder along one side of said cylinder, an operating knob secured to said shaft adjacent said other end of said cylinder, a fluid pressure system for effecting relative reciprocation of said piston and cylinder, longitudinal passages in said cylinder for conducting fluid to and from the portions of the cylinder to opposite sides of said piston, a supply tube telescopically mounted in each of said passages and secured to said support for conducting fluid to and from said passages, a valve assembly for controlling the rate of flow of fluid through one of said passages, said assembly comprising a cylindrical block fitted axially into said other end of said cylinder, at least one adjustable orifice valve in said block, a shaft extending from said valve to said other end of said cylinder, and an operating knob secured to the shaft at said other end of said cylinder, whereby the fluid connections to the mechanism are effected at said support, the adjusting knobs of the mechanism are located at said other end thereof and the mechanism comprises essentially a compact coaxial assembly.

18. In a power feed mechanism for power tools, a frame including an upright standard and an upper transverse support, a piston rod depending from said support and having limited movement relative thereto, a piston secured to the lower end of said rod axially thereof, a piston-embracing cylinder coaxial with said rod and slidably mounted on said standard, a head secured in the upper end of the cylinder outwardly of the piston and slidable on the piston rod, a threaded axial extension of reduced diameter projecting upwardly from the cylinder head, a gear journalled on the cylinder head concentrically of the extension, a ring coaxial with an internally threaded for rotative axial movement on the threaded extension, rods mounted on the gear and telescoping with the ring whereby rotation of the gear effects axial movement of the ring on the extension, an annular flange on the supporting frame concentric with said piston rod and disposed intermediate the gear and ring for engagement by the ring for limiting the stroke of the cylinder relative to the piston, a rotatable shaft operatively associated with said gear and extending downwardly therefrom along one side of said cylinder, an operating knob secured to said shaft adjacent the lower end of said cylinder, a fluid pressure system for effecting relative reciprocation of the piston and cylinder, longitudinal passages in said cylinder for conducting fluid to and from the portions of the cylinder to opposite sides of said piston, a supply tube telescopically mounted in each of said passages and secured to said support for conducting fluid to and from said passages, a control instrumentality for said system mounted on said support and including a first actuator coaxial with an engageable by said piston rod and a second actuator eccentrically disposed with respect to said piston rod and engageable by said extension, a spring coaxial with said piston rod and interposed between said piston rod and said support for biasing said piston rod away from said support, said spring accommodating limited movement of said piston rod and said piston when said ring engages said flange to accommodate actuation of said first actuator when said cylinder is moved away from said support, said extension actuating said second actuator when said cylinder approaches said support, a valve assembly for controlling the rate of flow of fluid into and out of one end of said cylinder, said assembly comprising a cylindrical block fitted axially into the lower end of said cylinder, at least one adjustable orifice valve in said block, a shaft extending from said valve to the lower side of said cylinder, and an operating knob secured to the shaft at the lower end of said cylinder, whereby all of the fluid connections to the mechanism are effected at the upper end thereof, all of the adjusting knobs of the mechanism are located at the lower end thereof and the mechanism comprises essentially a compact coaxial assembly.

No references cited.